(12) United States Patent
Rana et al.

(10) Patent No.: US 7,839,102 B1
(45) Date of Patent: *Nov. 23, 2010

(54) SYSTEM AND PROCESS FOR UTILIZING BACK ELECTROMOTIVE FORCE IN DISK DRIVES

(75) Inventors: Sakti Pada Rana, Singapore (SG);
Kuong Hoo, legal representative, Singapore (SG); Vishnu Kumar, Singapore (SG); Siew Yong Chui, Singapore (SG)

(73) Assignee: Marvell International Ltd, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/493,944

(22) Filed: Jun. 29, 2009

Related U.S. Application Data

(63) Continuation of application No. 12/026,274, filed on Feb. 5, 2008, now Pat. No. 7,560,883, which is a continuation of application No. 11/797,196, filed on May 1, 2007, now Pat. No. 7,327,106, which is a continuation of application No. 11/179,593, filed on Jul. 13, 2005, now Pat. No. 7,211,973.

(60) Provisional application No. 60/643,026, filed on Jan. 7, 2005, provisional application No. 60/687,447, filed on Jun. 6, 2005.

(51) Int. Cl.
*H02P 6/02* (2006.01)
*H02P 1/18* (2006.01)

(52) U.S. Cl. ........................ 318/254; 318/138; 318/439; 318/400.05; 318/400.06; 318/400.35

(58) Field of Classification Search ............ 318/400.09, 318/400.25, 400.34, 603, 801, 138, 254, 318/439, 400.05, 400.06, 400.35
See application file for complete search history.

(56) References Cited

U.S. PATENT DOCUMENTS

| | | | |
|---|---|---|---|
| 3,781,470 A | 12/1973 | Horn | |
| 4,055,817 A | 10/1977 | Watanabe et al. | |
| 4,366,521 A | 12/1982 | Jessee | |
| 4,703,245 A | 10/1987 | Sakamoto | |
| 4,703,246 A | 10/1987 | Sakamoto | |
| 4,888,533 A | 12/1989 | Gotoh | |
| 4,912,378 A | 3/1990 | Vukosavic | |
| 4,961,182 A * | 10/1990 | Saito et al. | 369/124.15 |
| 5,119,000 A * | 6/1992 | Schultz | 318/400.25 |
| 5,210,712 A * | 5/1993 | Saito | 708/819 |
| 5,210,948 A | 5/1993 | Seksaria et al. | |
| 5,245,523 A * | 9/1993 | Juzswik | 363/56.03 |
| 5,323,093 A | 6/1994 | Kikuchi | |
| 5,440,219 A | 8/1995 | Wilkerson | |
| 5,508,579 A * | 4/1996 | Suganuma | 310/316.02 |
| 5,672,948 A * | 9/1997 | Cohen et al. | 318/603 |
| 5,703,449 A | 12/1997 | Nagate | |
| 5,710,491 A | 1/1998 | Takagi et al. | |
| RE35,852 E | 7/1998 | Takagi | |
| 5,777,445 A | 7/1998 | Motegi | |

(Continued)

*Primary Examiner*—Paul Ip

(57) ABSTRACT

A circuit system and process utilizes back electromotive force (BEMF) voltage to assist in safe power down of devices, such as the read/write head in from low factor disk drives or similar devices. The BEMF voltage from a motor device, such as a spindle motor utilized in a circuit using negative voltage to drive some switches, such as positive channel metal oxide semiconductor ("PMOS") driver transistors, to reduce and/or effectively minimize the on-resistance of the switches while delivering the current from BEMF voltage of the motor to another device, such as a motor that retracts controls a read/write head.

20 Claims, 2 Drawing Sheets

U.S. PATENT DOCUMENTS

| | | |
|---|---|---|
| 5,777,449 A | 7/1998 | Schlager |
| 5,870,298 A | 2/1999 | Hung |
| 5,886,486 A | 3/1999 | Jeong |
| 6,023,136 A * | 2/2000 | Pinewski ............... 318/400.09 |
| 6,064,174 A * | 5/2000 | Sziebert ...................... 318/801 |
| 6,424,106 B2 | 7/2002 | Gotou |
| 6,593,751 B2 * | 7/2003 | Takahashi .................. 324/551 |
| 6,674,268 B2 * | 1/2004 | Rutter et al. ................ 323/224 |
| 6,697,204 B2 * | 2/2004 | Cyrusian ..................... 360/51 |
| 6,771,033 B2 | 8/2004 | Kokami |
| 6,900,604 B2 | 5/2005 | Kokami |
| 6,995,530 B2 | 2/2006 | Biamonte |
| 7,088,063 B2 | 8/2006 | Kurosawa |
| 7,095,195 B2 | 8/2006 | Tagome |
| 2001/0028230 A1 | 10/2001 | Gotou et al. |
| 2002/0017887 A1 | 2/2002 | Gotou et al. |
| 2002/0140395 A1 | 10/2002 | Tazawa et al. |
| 2003/0156439 A1 * | 8/2003 | Ohmichi et al. ............. 363/98 |
| 2004/0263231 A1 * | 12/2004 | Trafton et al. ............... 327/327 |
| 2005/0053367 A1 * | 3/2005 | Fulton ....................... 388/814 |
| 2005/0258788 A1 | 11/2005 | Mori |
| 2006/0055352 A1 | 3/2006 | Mori |
| 2006/0097674 A1 | 5/2006 | Nishihara |
| 2007/0046704 A1 * | 3/2007 | Okuda ........................ 347/11 |
| 2007/0172459 A1 * | 7/2007 | Gantier et al. ............. 424/85.5 |
| 2008/0012570 A1 * | 1/2008 | Bucur ......................... 324/426 |
| 2008/0157894 A1 * | 7/2008 | Hariton et al. ............. 332/109 |
| 2009/0256617 A1 * | 10/2009 | Ochi .......................... 327/333 |
| 2009/0322407 A1 * | 12/2009 | Lenz et al. ................. 327/419 |
| 2009/0322426 A1 * | 12/2009 | Nyboe et al. ............... 330/251 |
| 2010/0050024 A1 * | 2/2010 | Covalenco et al. ........... 714/47 |

* cited by examiner

SYSTEM AND PROCESS FOR UTILIZING BACK ELECTROMOTIVE FORCE IN DISK DRIVES

CROSS REFERENCE TO PRIOR APPLICATIONS

This application is a Continuation of U.S. application Ser. No. 12/026,274, filed on Feb. 5, 2008, now U.S. Pat. No. 7,560,883, which is a Continuation of U.S. application Ser. No. 11/797,196, filed on May 1, 2007, now U.S. Pat. No. 7,327,106, which is a Continuation of U.S. application Ser. No. 11/179,593, filed on Jul. 13, 2005, now U.S. Pat. No. 7,211,973, which claims priority under 35 U.S.C. §119(e) and the benefit thereof from U.S. Provisional Application Ser. No. 60/643,026, filed on Jan. 7, 2005, and U.S. Provisional Application Ser. No. 60/687,447, filed on Jun. 6, 2005, the disclosures of which are expressly incorporated by reference herein in their entirety.

BACKGROUND

1. Field of the Invention

The invention relates generally to a system and process for utilizing electromotive force and, more particularly, to a system and process for utilizing back electromotive force voltage from low form factor disk drives and similar devices.

2. Related Art

Disk drives, including low form factor disk drives such as those of a diameter of 1.8" and below, use a motor to rotate the data media at high rates. Another motor, typically a voice coil motor ("VCM"), is used in disk drives to extend and retract the read/write head that interacts with the media. The disk drive may interact with data media using magnetic, optical, electrical, or other methods.

The media rotation motors are typically spindle motors, which may be three phase motors having a rotor with permanent magnets and a stator having three phase windings. Electrical current is passed through the windings to induce a magnetic field that interacts with the magnets on the rotor, and causes the rotor to turn. Typically, at any particular time, two phases of the windings are driven, while the third phase is not driven. The rotor thus rotates the data media, such as a computer readable media, at high revolutions per minute.

When the spindle motor is no longer powered, such as during power failure, the electrical current in the windings is switched off, and the rotor stops turning. Further, the read/write head motor for extending and retracting the read/write head is also without power. When the power failure occurs, it is desirable to retract the read/write head from the data media before the rotor stops. If the data media stops turning with the read/write head extended over it, the head and/or data media may be damaged.

Even during a power failure, it generally takes a short amount of time for the rotor in the turning motor to come to a complete stop due to inertia and residual forces. During that time, a back electromotive force ("BEMF") voltage having a sinusoidal nature is generated in the stator windings of the motor by the magnets in the rotor. Specifically, as the permanent magnets pass by the windings, a current is induced in the windings. It may be desirable to use the BEMF voltage to provide power to other devices such as the read/write head motor to retract the read/write head from the data media. To use the BEMF three-phase sinusoidal voltages to retract the read/write head during the power down operation in a power failure, the voltages typically must first be rectified.

Traditionally, power driver transistors are configured as synchronous rectifiers by turning on the respective phase driver transistors during power failure. However, when the available BEMF voltage from the spindle motor is of the order or less than the threshold voltage of a transistor, such as a standard complementary metal-oxide semiconductor ("CMOS") transistor or a positive channel metal oxide semiconductor transistor, the driver transistors often cannot be turned on, or will provide a large on resistance when providing current to a device, such as the motor that retracts the read/write head. This resistance can reduce or prevent sufficient current from being provided to the motor that controls the read/write head, which then may not be retracted or retracted fully during power down.

Accordingly, there is a need for a more reliable way to use BEMF voltage to power the read/write head or other components of disk drives and similar devices during a loss of power.

SUMMARY OF THE INVENTION

The invention avoids the disadvantages and drawbacks of the prior art and/or satisfies the need to more effectively and reliably use back electromotive force voltage when a motor is not receiving power to power down components by providing a system and process for rectifying back electromotive to provide sufficient current to power another device, such as a motor controlling the position of a read/write head.

The invention may be implemented in a number of ways for disk drives and any other device or application in which BEMF or other voltage is needed to be reliably and effectively rectified. According to one aspect of the invention, a switching circuit utilizing back electromotive force ("BEMF") voltage includes a plurality of first switches for controlling current in the circuit and at least one controller for operating the plurality of first switches. The controller includes a first comparator for comparing BEMF voltage generated in one of the phases of a motor having a plurality of phases to a first voltage and providing an output voltage, and a first level shifter receiving the output voltage of the first comparator and shifting the output voltage to a level shifted first voltage. At least one of the plurality of first switches is responsive to the controller. The controller may also include a second comparator for comparing BEMF voltage generated in one of the phases to a second voltage and providing a second output voltage and an amplifier receiving the second output voltage of the second comparator and amplifying the second output voltage to an amplified voltage. The plurality of first switches may include two switches controlling current induced by BEMF voltage in the same phase of the motor, wherein one of the switches is responsive to the level shifted voltage and the other of the switches is responsive to the amplified voltage. A store may communicate with one of the two switches and may accumulate charge generated by BEMF voltage in at least one of the phases. The plurality of first switches may comprise positive channel metal oxide semiconductor transistors. The level shifted first voltage may minimize the on resistance of at least one of the plurality of first switches.

The circuit may also include at least one second switch in communication with at least one of the plurality of first switches, and a second controller including a second level shifter receiving a second voltage and shifting the second voltage to a level shifted second voltage. The at least one second switch may be responsive to the level shifted second voltage. The second level shifter may include a voltage input receiving the second voltage, where the second voltage varies between a first voltage level and a second voltage level, and a negative voltage input receiving a negative voltage level. The level shifted second voltage may vary between the first voltage level and the negative voltage level. Further, the circuit may be combined with a device responsive to a current flowing through the at least one second switch. The device may be a voice coil motor in a disk drive that controls movement of a read/write head and the circuit may utilize BEMF voltage generated from a spindle motor of the disk drive. The first level shifter may include a voltage input receiving the output voltage, where the output voltage varies between a first voltage level and a second voltage level and a negative voltage input receiving a negative voltage level. The level shifted first voltage may vary between the first voltage level and the negative voltage level. A store may communicate with the first level shifter and may have a negative voltage ranging between ground and a negative value. The first level shifter may shift the output voltage to the level shifted first voltage based on the negative voltage. The circuit also may include a pre-amplifier device in communication with the store. The pre-amplifier device may be placed in a sleep mode to reduce voltage leakage from the store, and may be woken by a signal from a system on chip. The circuit may be combined with a store, which may be charged by current flowing through at least one of the plurality of first switches. A device, such as a voice coil motor that retracts a read/write head of a disk drive during power down of the motor may be responsive to the store. The motor may be a spindle motor of a disk drive of a motor and may have at least three phases. The at least one controller may include a controller responsive to the BEMF generated in each phase of the motor. Each controller may include a first comparator, a second comparator and a level shifter shifting voltage to minimize the on resistance of at least one of the plurality of first switches. Each controller may operate two of the plurality of first switches.

In another aspect of the invention, a method for utilizing back electromotive force ("BEMF") voltage includes the steps of comparing BEMF voltage generated in one of the phases of a motor having a plurality of phases to a first voltage, providing an output voltage based on the comparison step, level shifting the output voltage to a level shifted first voltage, and controlling at least one of a plurality of first switches using the level shifted first voltage. The method also may include comparing BEMF voltage generated in one of the phases to a second voltage, providing a second output voltage based on the second comparison, amplifying the second output voltage to an amplified voltage and controlling at least one other of the plurality of first switches using the amplified voltage. The level shifted first voltage may minimize the on resistance of at least one of the plurality of first switches.

The method may also include storing charge generated by BEMF voltage in at least one of the phases. The method also may include controlling at least one second switch using a level shifted second voltage. The second voltage may vary between a first voltage level and a second voltage level, and the step of shifting the second voltage may include receiving a negative voltage level. The level shifted second voltage may vary between the first voltage level and the negative voltage level. The method also may include the step of powering a device responsive to a current flowing through the at least one second switch. The device may be a voice coil motor that controls movement of a read/write head utilizing BEMF voltage generated from a spindle motor of the disk drive. In addition, the output voltage may vary between a first voltage level and a second voltage level, and the step of level shifting may include receiving a negative voltage level. The level shifted voltage may vary between the first voltage level and the negative voltage level. The method may also include the step of storing a negative voltage ranging between ground and a negative value. The step of level shifting the output voltage to the level shifted first voltage may be based on the negative voltage. The method may also include the steps of placing a pre-amplifier device in a sleep mode to reduce leakage of the negative voltage and waking the pre-amplifier device using a signal from a system on chip. The method may also include the step of charging a store using current flowing through at least one of said plurality of first switches and retracting a read/write head of a disk drive during power down of the motor utilizing the stored charge.

In another aspect of the invention, a switching circuit utilizing back electromotive force ("BEMF") voltage includes a plurality of first means for controlling current, such as switches, in the circuit, and at least one means for operating the plurality of controlling means, such as at least one controller. The at least one operating means includes first means for comparing, such as a comparator, BEMF voltage generated in one of the phases of a motor having a plurality of phases to a first voltage and providing an output voltage, and first means for shifting, such as a level shifter, the output voltage to a level shifted first voltage. At least one of the plurality of first controlling means is responsive to the at least one operating means. The at least one operating means further may include second means for comparing BEMF voltage generated in one of the phases to a second voltage and providing a second output voltage, and means for amplifying, such as an amplifier, the second output voltage to an amplified voltage. The plurality of first control means may include two control means controlling current induced by BEMF voltage in the same phase of the motor. One of the control means may be responsive to the level shifted voltage and the other of the control means may be responsive to the amplified voltage. The circuit may be combined with a means for storing charge, such as a capacitor, based upon current flowing through at least one of the plurality of first controlling means and means, such as a voice coil motor, responsive to the storing means. The plurality of first controlling means may include positive channel metal oxide semiconductor transistors. The level shifted first voltage may minimize the on resistance of at least one of the plurality of first controlling means.

The circuit may also include a means for storing charge, such as a capacitor, in communication with one of the two controlling means. The storing means may accumulate charge generated by BEMF voltage in at least one of the phases. The circuit also may include at least one second controlling means, such as a switch, in communication with at least one of the plurality of first controlling means, and a second operating means, such as a controller, which may include a second means for shifting, such as a level shifter, a second voltage to a level shifted second voltage. The at least one second controlling means may be responsive to the level shifted second voltage. The second shifting means may include a voltage input receiving the second voltage, where the second voltage may vary between a first voltage level and a second voltage level, and a negative voltage input receiving a negative voltage level. The level shifted second voltage may vary between the first voltage level and the negative voltage level. The circuit may be combined with a disk drive and a device responsive to a current flowing through the at least one second controlling means, such as a voice coil motor that controls movement of a read/write head. The circuit may utilize BEMF voltage generated from a spindle motor of the disk drive. The first shifting means may include a voltage input receiving the output voltage, where the output voltage may vary between a first voltage level and a second voltage level, and a negative voltage input receiving a negative voltage level. The level shifted voltage may vary between the first voltage level and the negative voltage level. The circuit may also include a means for storing charge, such as a capacitor, in communication with the first shifting means and having a negative voltage ranging between ground and a negative value. The first shifting means may shift the output voltage to the level shifted voltage based on the negative voltage. The circuit may also include a pre-amplifier device in communication with the storing means, where the pre-amplifier device may be placed in a sleep mode to reduce voltage leakage from the storing means, and maybe woken by a signal from a system on chip. The circuit may be combined with a means for storing charge, such as a capacitor, from current flowing through at least one of the plurality of first controlling means. The combination may also include a device responsive to the storing means, such as a voice coil motor that retracts a read/write head of a disk drive during power down of the motor. The motor may be a spindle motor of a disk drive and may have at least three phases. The at least one operating means may be responsive to the BEMF generated in each phase of the motor. Each operating means may include a first means for comparing and a second means for comparing, and the operating means may operate two of said plurality of first controlling means. Each operating means also may include a means for shifting voltage to minimize the on resistance of at least one of the plurality of first controlling means.

Additional features, advantages and embodiments of the invention may be set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE FIGURES

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention. In the drawings.

DETAILED DESCRIPTION OF THE INVENTION

Figure 1:
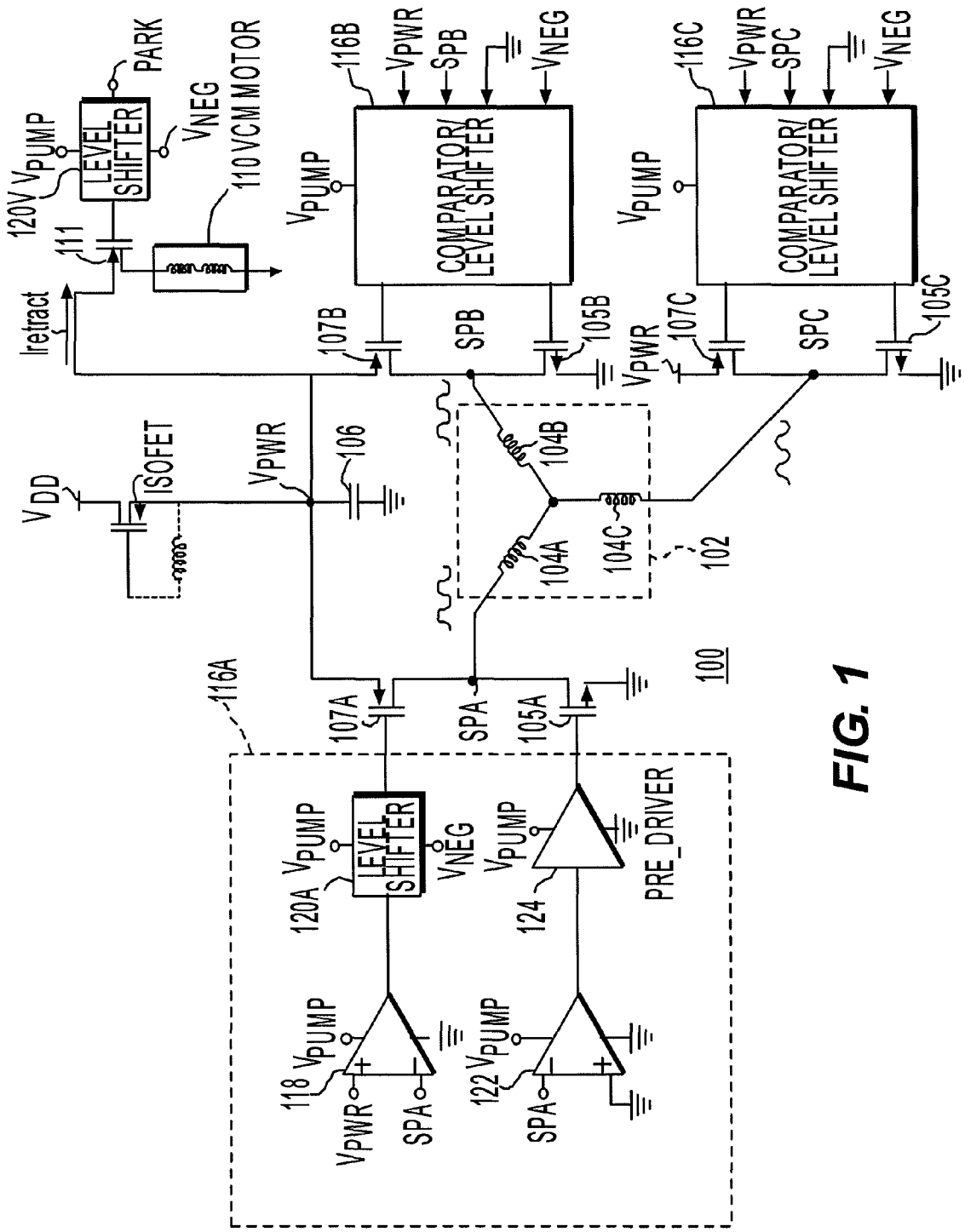
FIG. 1 is a diagram of a back electromotive force rectifier constructed according to the principles of the invention that may be used with the spindle motor of a disk drive.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numbers represent similar parts throughout several views of the drawings.

A system and process for utilizing back electromotive force voltage provides sufficient current to operate a device, such as a motor that controls the position of a read/write head during power down of a low form factor disk drive. To achieve this and other principles of the invention, the BEMF voltage from a motor is utilized by incorporating negative voltage to drive some synchronous transistor switches, such as positive channel metal oxide semiconductor ("PMOS") driver transistors, and a boosted voltage from a reservoir capacitor to drive other transistor switches, such as negative channel metal-oxide semiconductor ("NMOS") driver transistors. This may reduce and/or effectively minimize the on-resistance of the synchronous transistor switches while delivering the current from BEMF voltage of the motor.

As described above, a transistor switch, such as a PMOS driver transistor, is driven by a negative voltage $V_{neg}$ instead of using a zero volt input. This may be achieved using a level shifter, which translates an output voltage from a level of $V_{pump}$ to 0V to a level of $V_{pump}$ to $V_{neg}$. Thus, the gate-source voltage ($V_{gs}$) of a PMOS driver transistor is increased, thereby lowering the on-resistance while supplying current from BEMF voltage. According to one embodiment of the invention, the level shifter will provide a voltage difference greater than the threshold voltage of a switch transistor.

During normal operation, a $V_{neg}$ store will be charged to a negative voltage from an on-chip negative voltage regulator. Once a power down occurs, such as during a power failure, this path is cut off and voltage $V_{neg}$ is supplied to the level shifter(s) required to drive the PMOS drivers.

In order to prevent any leakage by other devices, such as a pre-amplifier device, a signal from a motor controller chip may be used to put the device in sleep mode. This helps preserve the voltage $V_{neg}$ for the level shifters. The device will be woken up by another signal once power is up.

FIG. 1 is a diagram of one embodiment of a back electromotive force rectifier circuit constructed according to the principles of the invention. More specifically, FIG. 1 illustrates a block diagram of the BEMF rectifier circuit 100, including the retract switch for a voice coil motor ("VCM") used to control the position of a read/write head. Circuit 100 includes a motor 102 having windings 104A, 104B, and 104C, which is typically a precision spindle motor having suitable bearings and run out properties to function as a disk drive motor.

As described above, when the motor is turned off and the current supplied to the windings is switched off, the rotor (not shown) begins to slow down. $V_{DD}$ represents the drive voltage for the motor. When $V_{DD}$ is turned off, the isolation MOSFET (ISOFET) switch is turned off and $V_{pwr}$ is held by the storage device 106. The permanent magnets in the rotor induce current in the windings 104A, 104B, and 104C, and a sinusoidal voltage is achieved at points SPA, SPB and SPC. A rectifier structure is configured around the points SPA, SPB and SPC to rectify the sinusoidal voltage and charge storage device 106 to a voltage $V_{pwr}$. The storage device 106, such as a capacitor or other storage device known in the art, is connected to a switch 111. When the switch 111 is turned on, the current from storage device 106 powers a motor, such as a VCM motor, to retract a read/write head or other component that must be moved during power down. The switch 111 may be a positive channel metal oxide semiconductor transistor or other structure known in the art. A level shifter 120V provides a voltage to drive switch 111 to control the switching. The rectifier structure, which includes a level shifter 120A, will now be described in greater detail.

According to an embodiment of the invention, the rectifier circuitry results in each of the windings 104A, 104B, and 104C having substantially the same components for rectifying the voltage from that particular winding. Switches 105A, 105B, 105C, 107A, 107B, 107C are the synchronous switches used for rectification, where switches 105A and 107A are associated with winding 104A, switches 105B and 107B are associated with winding 104B and switches 105C and 107C are associated with winding 104C. Switches 107A, 107B and 107C may be PMOS transistors or other structures known in the art, and switches 105A, 105B, and 105C may be NMOS transistors or other structures known in the art. For ease of discussion, only the components associated with winding 104A will be described in detail. However, it is understood that corresponding components are associated with windings 104B and 104C and may operate in a similar manner.

As described above, the output of winding 104A is connected to point SPA. Switch 105A is located between point SPA and ground. Switch 107A is located between SPA and point Vpwr. Switches 105A and 107A may be synchronous power transistors and the gate voltage for controlling the switching is provided by comparator/level-shifter 116A. Comparator/level-shifter 116A includes a first comparator 118, a level shifter 120, a second comparator 122 and a pre-driver 124.

Comparator 118 receives and compares the voltage $V_{pwr}$ at the point Vpwr with the voltage level at point SPA. Comparator 118 is powered by voltage $V_{pmp}$. The sinusoidal BEMF voltage at point SPA is compared against the $V_{pwr}$ voltage. The resulting output voltage is sent to level shifter 120A. If the voltage at SPA is greater than the voltage at Vpwr, the comparator 118 outputs a signal to close switch 107A. If the voltage at SPA is less than the voltage of Vpwr, the comparator 118 outputs a signal to open switch 107A. Using voltages $V_{pump}$ and $V_{neg}$ to power the level shifter 120A, the comparator output voltage is shifted to a level shifted voltage. The level shifted voltage may be shifted to a range of a $V_{neg}$-$V_{pmp}$ level. This level shifted voltage drives the switch 107A. According to an embodiment of the invention, by generating a level shifted voltage to a $V_{neg}$-$V_{pmp}$ level, a higher $V_{gs}$ is obtained at the switch 107A, and a lower on-resistance is encountered. The operation of level shifter 120A will be described in greater detail below with respect to FIG. 3.

A storage device 106, such as a capacitor, is charged by current moving through switch 107A when it is turned on. The storage device 106 is charged to the available BEMF voltage at point SPA to obtain voltage $V_{pwr}$. Similarly, in comparator 122, the voltage level at SPA is compared against ground potential. The output voltage is provided to pre-driver 124, which also uses voltage $V_{pump}$. If the voltage at SPA is less than the ground potential, the comparator 122 outputs a signal to close switch 105A. If the voltage at SPA is greater than the ground potential, the comparator 122 outputs a signal to open switch 105A. Thus, the output from pre-driver 124 controls switch 105A, which may be turned on when the voltage level at point SPA goes below 0 volts, i.e., becomes a negative voltage, to avoid decreasing the charge in storage device 106.

As noted above, in one application of the invention, circuit 100 may be used to control motor 110, such as a VCM, during a power failure, where motor 110 controls at least the retraction of a read/write head (not shown) relative to the data media (also not shown) driven by the spindle motor. It will be apparent that circuit 100 also may be used to supply power to other types of circuits. By way of example, the read/write head may be in a disk drive, where the data media is a computer readable disk. The voltage $V_{pwr}$ generated and stored in storage device 106 of the circuit 100 is utilized to provide the required retract current for VCM 110. The retract switch 111 connects motor 110 to the point Vpwr. The current powers the motor 110 to retract the read/write head from the data media when the normal power to the motor 110 is no longer available, such as during a power failure of the disk drive. Switch 111 is driven by the output of the level shifter 120 to reduce and/or minimize on-resistance while delivering the retract current to the VCM 110.

Figure 2:
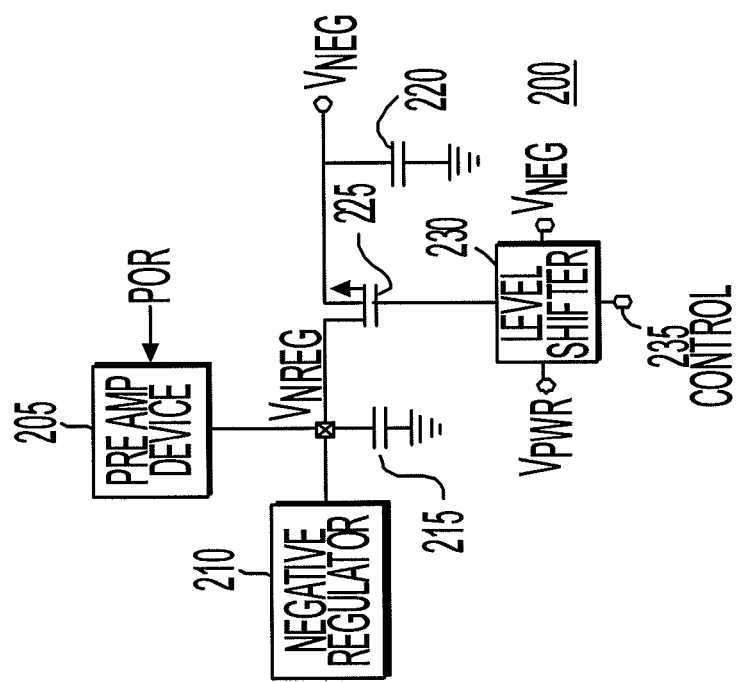
FIG. 2 is a diagram of a circuit that may be used in the rectifier of the invention for generating a voltage $V_{neg}$ used to drive the power drive transistors.

FIG. 2 is a diagram of a circuit 200 constructed according to the principles of the invention for generating a voltage $V_{neg}$ used by lever shifter 120A and level shifter 120V. Circuit 200 includes a pre-amp device 205, a negative regulator 210, stores 215 and 220, a switch 225, and a level shifter 230. According to an embodiment of the invention, during normal operation of a device, such as a disk drive, the storage device 220, which may be a capacitor or other storage device known in the art, is charged to a negative voltage $V_{neg}$ through the switch 225 from the on-chip negative regulator 210. The on-chip negative voltage regulator 210 outputs a negative voltage at point Vnreg and also charges storage device 215, which may be a capacitor or other storage device known in the art. The current flows through switch 225 to charge storage device 220 to voltage $V_{neg}$. Switch 225 is driven by level shifter 230, which has a control input 235 as well as a voltage input of $V_{pwr}$ and $V_{neg}$. Switch 225 may be an NMOS transistor or other gating structure known in the art.

According to an embodiment of the invention, when power has failed, switch 225 is turned off to prevent any leakage of the voltage $V_{neg}$ through the pre-amp device 205. The voltage $V_{neg}$ in the storage device 220 is provided as indicated in circuit 100 and circuit 200, such as to the level shifters 120A, 120V and 230. While the absolute value of voltage $V_{neg}$ may depend on the output of negative regulator 210, values for voltage $V_{neg}$ may range from about –2 volts to about –5 volts, with a value of –2.1 volts being one specific example. The pre-amplifier device 205 may be shut down to a sleep mode, e.g., a very low power mode, by a power on reset ("POR") signal of the motor controller when the overall device moves to a power down operation, such as during a power failure. This may reduce or eliminate voltage $V_{neg}$ from leaking through the pre-amp device 205. The pre-amp device 205 is awaken, e.g., activated to normal power mode, by a system on chip ("SOC") signal once power is restored to the overall system. Pre-amp device 205 may read and/or write data from and into a storage media. This method may help to achieve an increased amount of time for the retract while providing the retract current from the motor BEMF.

Figure 3:
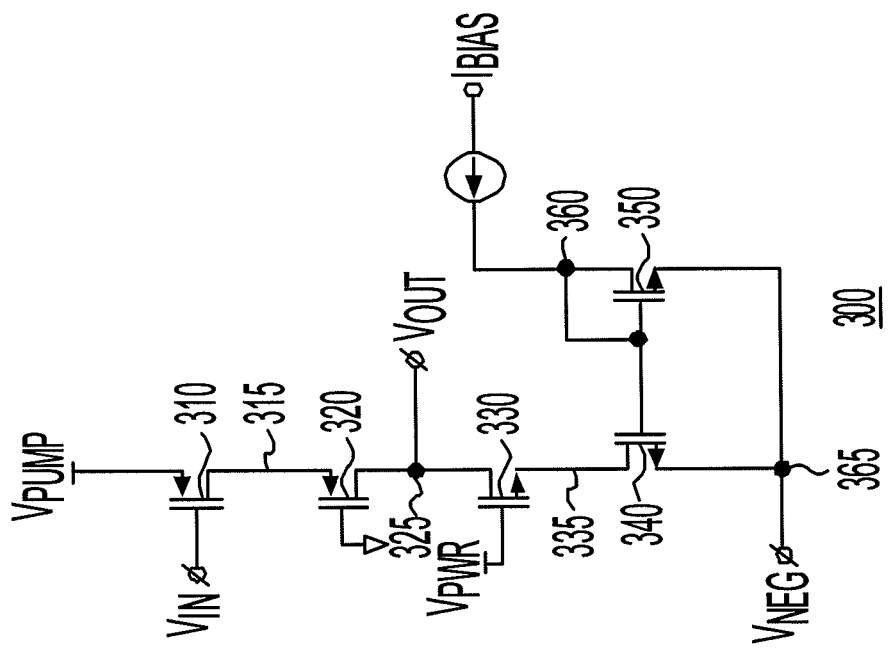
FIG. 3 is a diagram of a level shifter circuit that may be used in the rectifier of the invention.

FIG. 3 is a diagram of a level shifter circuit 120A, 120V or 230 constructed according to the principles of the invention. More specifically, FIG. 3 shows an exemplary implementation of the level shifter circuit 300, used to drive switches 107A, 107B and 107C of circuit 100. Circuit 300 includes a voltage provided by $V_{pump}$, a first switch 310, a voltage input $V_{in}$, a second switch 320, a voltage output $V_{out}$, a third switch 330, a power voltage input $V_{pwr}$, a fourth switch 340, a fifth switch 350, negative voltage input $V_{neg}$ and a bias current $I_{bias}$.

The first switch 310 is connected to voltage $V_{pump}$ and is driven by the voltage input $V_{in}$. The first switch 310 is also connected at point 315 to the second switch 320. Voltage $V_{in}$, which is provided as the output from comparator 118, controls the switch 310 to control current flow between $V_{pump}$ and point 315. The gate of the second switch 320 is connected to ground, resulting in a voltage difference $V_{gs}$ between point 315 and ground. This connection may leave second switch 320 closed to allow current to flow.

The other end of the second switch 320 is connected to the third switch 330 at point 325. The voltage output $V_{out}$ is also connected to point 325. Voltage $V_{pwr}$ is connected to the gate of the third switch 330, while the other end of the third switch 330 is connected to point 335. Point 335 is also at a potential of $V_{pwr}$-$V_{gs}$.

The fourth switch 340 is connected to point 335 and point 365. Point 365 is connected to the negative voltage input $V_{neg}$. The gate of the fourth switch 340 and the gate of the fifth switch 350 are connected to point 355. The switch 350 is connected to points 360 and 365, respectively. Point 360 is directly connected to point 355 by a short. Bias current $I_{bias}$ is connected at point 360. $I_{bias}$ may be supplied from an internal reference current source.

The circuit 300 functions to shift the range of the voltage received at point $V_{in}$. A standard buffer generally will have an output that ranges from about zero volts to the value of voltage $V_{in}$ up to the value $V_{pump}$. Circuit 300 increases this range by replacing the ground voltage with $V_{neg}$. The difference between the high and low values results in a larger $V_{gs}$ (gate to source voltage) used for opening and closing the switch, thereby reducing and/or minimizing on-resistance in the driven transistor. This allows higher currents to flow through the switch from the available BEMF voltage, such as a spindle motor. Thus, improved rectification using BEMF voltage may be obtained using switches, such as MOSFETS.

According to an embodiment of the invention, such as in the example of a circuit constructed according to the principles of the invention and used in a standard 1.8" disk drive, circuit 300 may have a bias current $I_{bias}$ of the order of 10 μA. Currents of this magnitude may increase or maximize the amount of time to retract by drawing only limited controlled current from the $V_{neg}$ store 220 in circuit 200. According to an embodiment of the invention, a power down sequence may result in values where the BEMF voltage is about 0.9 volts. Further, $V_{pwr}$ may be about 0.9 volts and $V_{pump}$ may be about 2.0 volts. Although $V_{neg}$ may vary based on the negative regulator used, the value of $V_{neg}$ may be about −2.0 volts.

As described according to various principles of the invention, utilizing a negative voltage to drive switches, such as PMOS transistor switches, enables the above-described system to rectify and utilize relatively low BEMF voltage during power failure operation. By the way of example, the BEMF voltage may be as low as 0.8 volts and still be rectified to allow sufficient charge of a store to operate another device, such as a VCM motor to retract a read/write head.

Thus, as described above, various embodiments of the invention as described by way of example in circuits 100, 200 and 300 above, may provide the required retract current to operate a VCM or similar device from a low amplitude BEMF voltage motor. Further, extremely low amplitude BEMF voltages may be rectified. The rectifying switches may have a low on-resistance, as the retract switch on-resistance may be reduced and/or minimized. Further, the amount of time for retract may be maximized. The pre-amp device may be placed in sleep mode by a POR signal to reduce or minimize leakage of the negative voltage $V_{neg}$. When power is restored, the pre-amp device may be woken up by the SOC. Hence, the skilled artisan will recognize that the circuits of the invention may have wider applicability than the specific disk drive embodiment described. Anytime BEMF voltage is being used or enhanced rectifying is desirable, the circuits of the invention may be employed.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A device comprising a motor and circuitry utilizing a back electromotive force ("BEMF") voltage generated from the motor, the circuitry comprising:
   a circuit that generates an output voltage based on the BEMF voltage; and
   a level shifter that shifts the output voltage to a level shifted voltage based on a negative voltage level, the level shifter comprises:
      a voltage input that receives the output voltage varying between a first voltage level and a second voltage level; and
      a negative voltage input that receives the negative voltage level,
   wherein the level shifted voltage varies between the first voltage level and the negative voltage level.

2. The circuitry according to claim 1, wherein the level shifted voltage operates a switch that controls current in the circuitry.

3. The circuitry according to claim 2, wherein the level shifted voltage minimizes a resistance of the switch.

4. The circuitry according to claim 1, further comprising an electric charge store operatively coupled with the level shifter and having a negative voltage ranging between ground and a negative value.

5. The circuitry according to claim 4, further comprising a pre-amplifier device in communication with the electric charge store,
   wherein the pre-amplifier device is placed in a sleep mode to reduce voltage leakage from the electric charge store.

6. The circuitry according to claim 1, further comprising a capacitor charged by current flowing through the switch.

7. The circuitry according to claim 6, wherein the circuitry is responsive to electric charge stored in the capacitor.

8. The circuitry according to claim 7, wherein the device comprises a disk drive and the motor retracts a read/write head of the disk drive using the electric charge stored in the capacitor during power down of the motor.

9. A device comprising a motor and circuitry utilizing a back electromotive force ("BEMF") voltage generated from the motor, the circuitry comprising:
   a switch that controls current in the circuitry; and
   a controller that operates the switch, the controller comprising:
      a circuit that generates an output voltage based the BEMF voltage; and
      a level shifter that shifts the output voltage to a level shifted output voltage,
   wherein the switch is responsive to the level shift output voltage.

10. The device of claim 9, wherein the level shifter comprises:
   a voltage input receiving the output voltage varying between a first voltage level and a second voltage level; and a negative voltage input receiving a negative voltage level,
wherein the level shifted output voltage varies between the first voltage level and the negative voltage level.

11. A method for utilizing back electromotive force ("BEMF") voltage, comprising:
deriving a BEMF voltage from a motor to generate a first output voltage;
level shifting the first output voltage to a level shifted first output voltage based on a negative voltage;
controlling a switch using the level shifted first output voltage to control a current flowing therethrough; and
storing electric charge generated by the BEMF voltage.

12. The method of claim 11, wherein the level shifting the first output voltage comprises receiving a negative voltage level, and
wherein the first output voltage varies between a first voltage level and a second voltage level, and the level shifted first output voltage varies between the first voltage level and the negative voltage level.

13. The method of claim 12, wherein the level shifting the first output voltage further comprises:
generating a negative voltage ranging between ground and the negative voltage level; and
storing the negative voltage.

14. The method of claim 13, further comprising:
placing a pre-amplifier device in a sleep mode to reduce leakage of the negative voltage; and
awakening the pre-amplifier device using a signal from a system on chip.

15. The method of claim 11, wherein the level shifted first output voltage reduces a resistance of the switch.

16. The method of claim 11 wherein the switch is a first switch, further comprising:
generating a second output voltage based on the BEMF voltage; and
controlling a second switch using the second output voltage.

17. The method of claim 16, wherein the generating the second output voltage comprises comparing the BEMF voltage to a ground potential.

18. The method of claim 11, further comprising powering a device using the stored electrical charge.

19. The method of claim 18, wherein the BEMF voltage is derived from the motor of a disk drive, and the device is a voice coil motor that controls movement of a read/write head of the disk drive.

20. The method of claim 11, wherein the stored electric charge is used to retract the read/write head during power down of the disk drive.

* * * * *